UNITED STATES PATENT OFFICE.

CHARLES PARNACOTT, OF PUTNEY, ENGLAND.

PROCESS OF MANUFACTURING METALLIC ALLOYS.

SPECIFICATION forming part of Letters Patent No. 578,465, dated March 9, 1897.

Application filed August 31, 1896. Serial No. 604,486. (No specimens.) Patented in England December 13, 1895, No. 23,950.

*To all whom it may concern:*

Be it known that I, CHARLES PARNACOTT, a subject of the Queen of Great Britain, residing at 2 Festing Road, Putney, county of Surrey, England, have invented certain new and useful Improvements in the Manufacture of Metallic Alloys, (patented in Great Britain, No. 23,950, dated December 13, 1895,) of which the following is a specification.

The object of this invention is to produce a white metallic alloy of good color, great tensile strength and elasticity, non-corrodible, impervious to the action of hydrochloric acid in sea-water, and all atmospheric influences, suitable for use in sea-water, for machinery, and all domestic purposes and appliances.

The proportions of the metals used are, by weight, say, copper, forty-four; nickel, twenty; spelter, twenty-five; iron, seven; cobalt, three; magnesium, one; total, one hundred.

The order of mixing the metals is as follows: First, I melt the nickel, and after clearing it from impurities to refine and toughen it I add the magnesium in minute charges and well stirring with plumbago rods. I then mix in an equal quantity of copper. Second, in another crucible I melt the other portion of copper with the iron and cobalt, and when they are thoroughly fused I pour the contents into the first-mentioned mass, keeping the same well stirred. When I see the metals are assuming the desired color, I stir with a charred wooden rod and add the spelter and keep stirring until all the dross and impurities are on the top of the crucible. I then skim off same and pour the fluid alloy quickly into ingots or molds, as required.

These alloys will resist oxidation, polish most brilliantly, and always retain their color—in fact, improve in appearance by wear, and will withstand the destructive influence of hydrochloric acid in sea-water and resist chemical fumes and atmospheric impurities.

What I claim, and desire to secure by Letters Patent, is—

1. The herein-described metallic alloy, consisting of copper, nickel, spelter, iron, cobalt and magnesium.

2. The process of manufacturing metallic alloy consisting of melting the nickel and clearing it from impurities, adding the magnesium in minute charges, stirring the mass with plumbago rods, then adding an equal quantity of copper the whole being well mixed, admixing with this mass a fused portion of copper, iron, and cobalt well stirring the material, then applying the spelter and stirring with a charred wooden rod until the material is thoroughly mixed and the dross and impurities are on the surface, removing said impurities and pouring the alloy into molds, as described.

In testimony whereof I have hereunto set my hand in presence of two subscribing witnesses.

CHARLES PARNACOTT.

Witnesses:
HENRY GARDNER,
RICHARD CORE GARDNER.